(12) United States Patent
Aponte Luis

(10) Patent No.: US 10,733,870 B2
(45) Date of Patent: Aug. 4, 2020

(54) FLOOD DETECTION DEVICE AND METHOD

(71) Applicant: ONTECH SECURITY, SL, La Rinconada, Seville (ES)

(72) Inventor: Juan Aponte Luis, Seville (ES)

(73) Assignee: ONTECH SECURITY, SL, La Rinconada, Seville (ES)

( * ) Notice: Subject to any disclaimer, the term of this patent is extended or adjusted under 35 U.S.C. 154(b) by 0 days.

(21) Appl. No.: 16/314,652

(22) PCT Filed: Jun. 29, 2017

(86) PCT No.: PCT/EP2017/066227
§ 371 (c)(1),
(2) Date: Dec. 31, 2018

(87) PCT Pub. No.: WO2018/002279
PCT Pub. Date: Jan. 4, 2018

(65) Prior Publication Data
US 2019/0251822 A1   Aug. 15, 2019

(30) Foreign Application Priority Data

Jun. 29, 2016 (EP) .................................... 16382311

(51) Int. Cl.
| | | |
|---|---|---|
| *G08B 21/20* | (2006.01) | |
| *G01F 23/24* | (2006.01) | |
| *G08B 25/00* | (2006.01) | |
| *G01F 23/00* | (2006.01) | |

(52) U.S. Cl.
CPC ........... *G08B 21/20* (2013.01); *G01F 23/241* (2013.01); *G08B 25/002* (2013.01); *G01F 23/0007* (2013.01); *G01F 23/0015* (2013.01)

(58) Field of Classification Search
CPC ... G08B 21/20; G08B 25/002; G01F 23/0007; G01F 23/0015; G01F 23/241

USPC ......................................................... 340/604
See application file for complete search history.

(56) References Cited

U.S. PATENT DOCUMENTS

| | | | |
|---|---|---|---|
| 5,091,715 A | 2/1992 | Murphy | |
| 5,283,569 A | 2/1994 | Nelson | |
| 10,255,782 B1* | 4/2019 | Ghannam | ............... G08B 21/10 |
| 10,414,235 B1* | 9/2019 | Yassan | ................. B60G 17/019 |
| 2011/0277546 A1 | 11/2011 | Armitage et al. | |
| 2014/0361887 A1* | 12/2014 | Eskildsen | ............... G01F 23/64 |
| | | | 340/539.1 |

(Continued)

FOREIGN PATENT DOCUMENTS

| | | |
|---|---|---|
| GB | 2 454 005 A | 4/2009 |
| WO | WO 2007/027342 A1 | 3/2007 |

OTHER PUBLICATIONS

International Search Report, dated Oct. 26, 2017 for corresponding International Application No. PCT/EP2017/066227.

(Continued)

*Primary Examiner* — Hirdepal Singh

(74) *Attorney, Agent, or Firm* — Intellectual Property Law Group LLP

(57) ABSTRACT

The present invention relates to a flood detector (100), more specifically to a domestic flood detector comprising an alarm for detecting a low moisture level, an alarm for detecting an intermediate moisture level and an alarm for detecting a high moisture level.

19 Claims, 3 Drawing Sheets

(56) References Cited

U.S. PATENT DOCUMENTS

| | | | | |
|---|---|---|---|---|
| 2015/0091723 A1* | 4/2015 | Fiedler | ................... | G08B 19/00 |
| | | | | 340/521 |
| 2017/0292839 A1* | 10/2017 | Lin | ...................... | G01C 13/008 |
| 2017/0303007 A1* | 10/2017 | Stilwell | .............. | H04N 21/4882 |
| 2017/0352266 A1* | 12/2017 | Watson | ................... | G01F 23/00 |

OTHER PUBLICATIONS

Written Opinion of the ISA, dated Oct. 26, 2017 for corresponding International Application No. PCT/EP2017/066227.

* cited by examiner

FLOOD DETECTION DEVICE AND METHOD

CROSS-REFERENCE TO RELATED APPLICATIONS

This application is a U.S. National Phase application, under 35 U.S.C. § 371, of International Application no. PCT/EP2017/066227, with an international filing date of Jun. 29, 2017, and claims benefit of European Application no. 16382311.5 filed on Jun. 29, 2016, each of which are hereby incorporated by reference for all purposes.

BACKGROUND OF THE INVENTION

1. Field of the Invention

The present invention relates to a flood detector, more specifically to a domestic flood detector comprising an alarm for detecting a low moisture level, an alarm for detecting an intermediate moisture level and an alarm for detecting a high moisture level.

2. Background

Flood detection systems which are used to provide warning of floods for large and small communities are known in the prior art. Such warning-type flood warning systems include a base station, having a microcomputer using flood prediction software, where this base station is linked by radio to rain gauges located far away from the mentioned station. Remote rain gauges record the amount of rain and said amount is transmitted when a predefined threshold amount is reached.

Generally, such flood warning systems have worked well for large communities which are capable of supporting a suitable group of technically qualified people to maintain the equipment in operation. However, for those smaller communities which cannot choose a team of technicians and engineers to work in the flood warning system, said communities are left in practice without any warning system whatsoever.

Patent document U.S. Pat. No. 5,283,569 describes a low-cost, easy-to-maintain and easy-to-operate flood warning system for providing advance warning to communities of impending floods, signaling the arrival of high water at locations in the basin upstream from the community. In particular, the invention includes a damping cylinder having three vertically spaced apart float switches therein for detecting the level of flood waters. Upon the water level reaching and closing the lowest level float switch, a telephone alarm dialer is actuated to transmit a first low stage flood warning message to a remote location over a telephone line. Upon the water level reaching and closing the second or middle level float switch, the lowest level float switch is disabled and the upper level float switch is enabled. Upon the water reaching and closing the upper level float switch the telephone alarm dialer is actuated to transmit a high stage flood warning message to the remote location. As the water recedes, upon dropping below and opening the middle level float switch the lowest level float switch is enabled and the upper level float switch is disabled thereby actuating the telephone alarm dialer to transmit a second low stage flood warning message to the remote location. This second low stage flood warning message indicates that the flood has crested.

These systems are not directly applicable to domestic applications. Generally, domestic flood detectors are based on the change in conductivity between at least two pins of an electronic system. An example of such systems is the one described in patent document US2015091723 which relates to different methods and systems for a flood and temperature sensor which can comprise detecting the presence of water in a premise by means of measuring a resistance between at least one pair of metal probes in a flood sensor, detecting a temperature, and detecting an orientation of the sensor with respect to gravity using one or more level sensors. The metal probes may be extendable. The metal probes may be gold-plated. The presence of water can be detected using a remote probe.

The sensor may communicate wirelessly with one or more external devices using a wireless transceiver.

Nevertheless, this document does not describe how to detect different flood levels, from a low flood level to a high flood level.

SUMMARY OF THE INVENTION

The object of the present invention is to enable detecting different water levels on a dry surface to be protected. As described, the current prior art does not describe any system for detecting water leaks which are determined in three different levels: moisture on the floor (low flood level), pool (intermediate flood level) and flood above two centimeters of water with respect to the floor.

To that end, the present invention essentially comprises measuring moisture by means of three pins internally connected to one another by means of a resistance meter between them, having an additional detector or pin at a height "h" with respect to the horizontal defined by the ends of the pins and where, furthermore, the body housing the detector has positive buoyancy characteristics.

The scope of the invention is defined by the claims which are incorporated in this section by reference. Throughout the description and claims the word "comprises" and variants thereof do not seek to exclude other technical features, accessories, components or steps. For those skilled in the art, other objects, advantages and features of the invention will be deduced in part from the description and in part from putting the invention into practice. The following examples and drawings are provided by way of illustration and do not seek to limit the present invention. Furthermore, the present invention covers all possible combinations of particular and preferred embodiments indicated herein.

BRIEF DESCRIPTION OF THE DRAWINGS

A series of drawings which help to better understand the invention and are expressly related to an embodiment of said invention presented as a non-limiting example thereof will be very briefly described below.

DETAILED DESCRIPTION

The different aspects of the invention comprise a flood detector capable of detecting three or more flood levels and the flood detection method implemented in said detector. As they are used herein, the terms "circuit" and "circuitry" refer to physical electronic components (i.e., hardware components) and any software and/or firmware (code) which can configure or susceptible of configuring the hardware and/or of being associated with the hardware in a different way. In certain parts of the description, hardware and software can be abbreviated as HW and SW, respectively.

Figure 1:
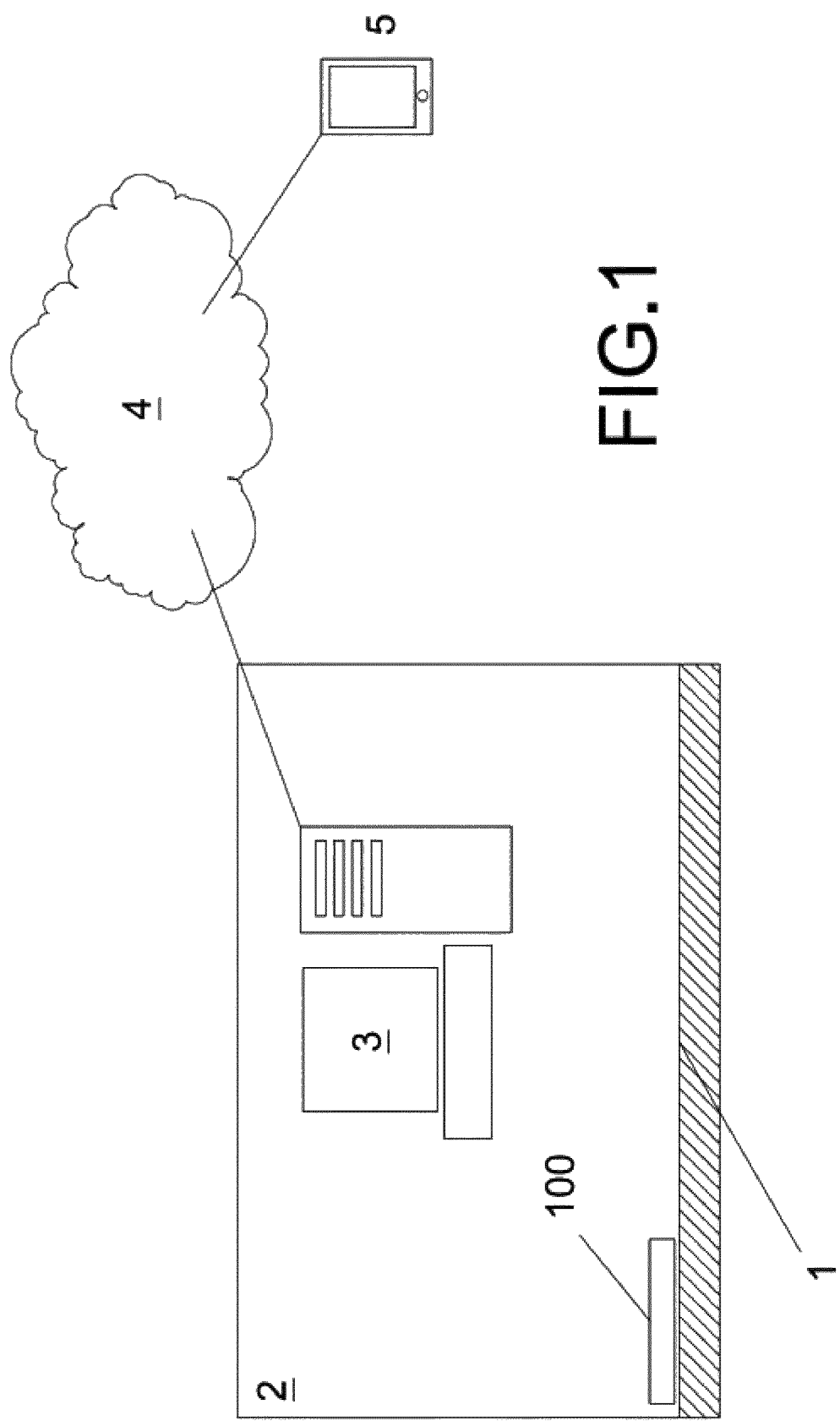
FIG. 1 shows a diagram with an example of using the flood detector 100 object of the invention integrated in an automated network.

In reference to FIG. 1, an example of using a flood detector 100 which is the object of the present invention is shown. The flood detector 100 will be arranged on a horizontal surface, such as the floor 1 of the housing 2 where the flood detector 100 is located.

The flood detector 100 is wirelessly connected with a management system 3, preferably an automated management system, configured as a computer or central processing unit which can be integrated in a single device or can be a distributed system. An integrated system can comprise, for example, a single computer or central processing unit (CPU), server, electronic machine or device, in which the integrated system can be configured to perform any or all of the functions, features and/or operations of the management system 3, as described in the present document. A distributed system can be implemented with a plurality of components connected to one another, preferably wirelessly, and where each component is configured for carrying out any or all of the functions, features and/or operations of the management system 3.

In one embodiment, the management system 3 implements one or more nodes which are in the form of one or more master controllers for controlling one or more flood detectors 100. A master controller can also comprise, for example, a remote controller.

Although FIG. 1 refers to a single management system 3, logically the description is not limited to a single embodiment. For example, several automated management systems can exist connected to one another through a data network 4, such that it is possible to cover much larger spaces 2 than with a single management system 3.

The communications between the flood detector 100 and the management system 3 are essentially wireless and can comprise different links and/or protocols such as, for example, Bluetooth, ZigBee, Bluetooth LE, Smart Bluetooth, iBeacon, near-field communication (NFC) protocols or WLAN WIFI (protocols 802.11) or any other type of wireless link or protocols suitable for data exchange between the management system 3 and the flood detector or detectors 100.

The management system 3 is furthermore communicated with at least one user terminal 5 through a data network 4. The communication can be direct or through a server of an alarm service, having in any case the same result, which is none other than communicating the incidences measured by the flood detector 100 to the user owning the user terminal 5. This user terminal 5 is a mobile telephone, a tablet or a personal computer and, in general, any electronic device capable of receiving and interpreting data coming from the management system 3 through a data network 4 or a mobile telephony network or a combination of both.

The flood detector 100 can furthermore define its own position through, for example, GPS, IPS and/or micromapping positioning and/or based on a position reference defined in the management system 3. For example, if the flood detector 100 moves from its desired position, a notification will be sent to the management system 3 and from said management system 3 to the user terminal 5 through the data network 4. Similarly, the detection of any level of alarm in the flood detector 100 can result in an order of the management system 3 or of the user terminal 5 to remotely cut off or close the source of the alarm, i.e., cutting off the passage of water to the location 2 in which the detector 100 is located and which, logically, is the place where the alarm has been generated.

Figure 2:
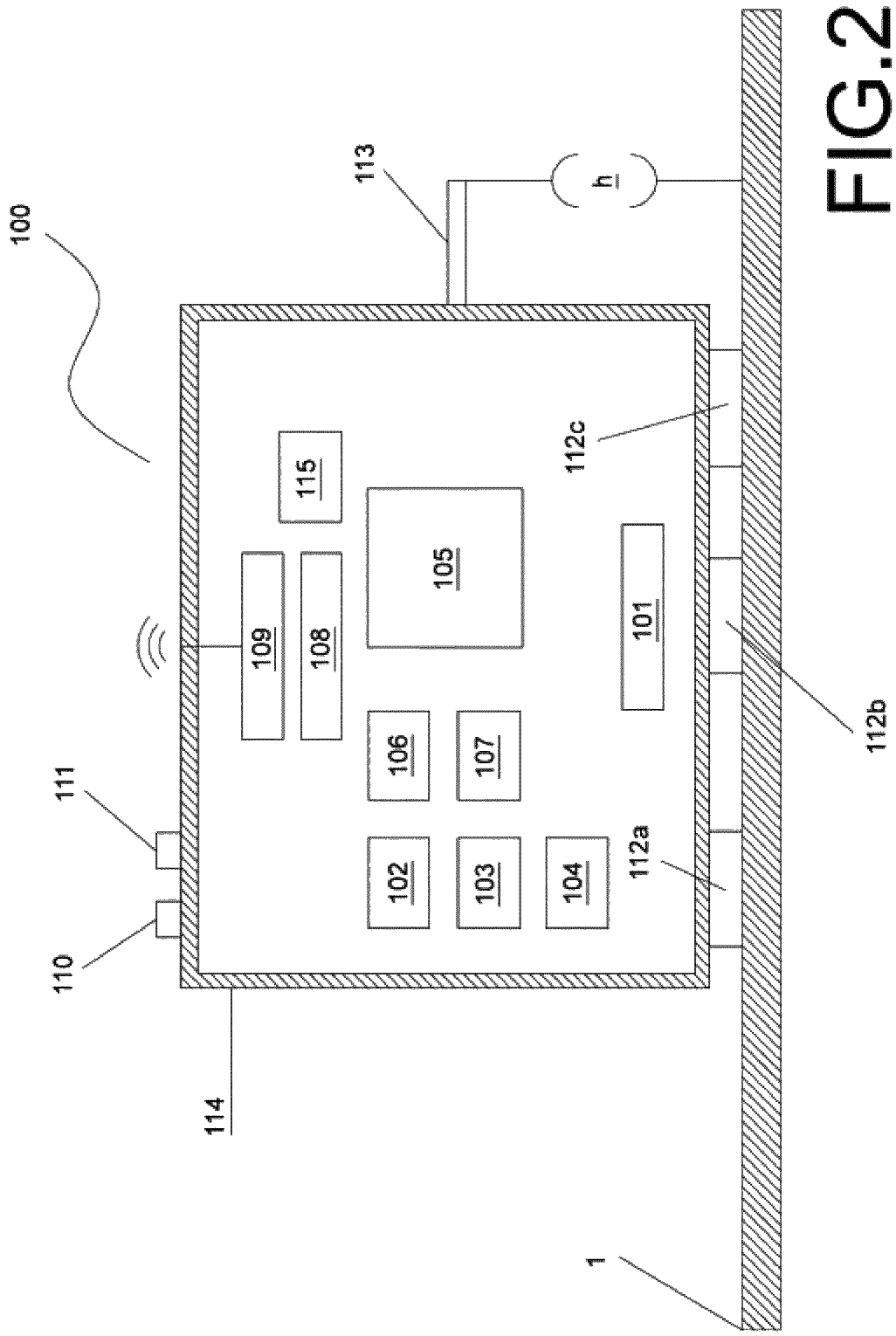
FIG. 2 shows a block diagram illustrating the flood detector 100 according to a preferred embodiment of the invention.

FIG. 2 shows a block diagram of the flood detector 100 object of the invention. As can be seen, in a particular embodiment of the invention, the detector 100 has a moisture sensor 101, a gyroscope 102, an accelerometer 103, a manipulation sensor 104 (i.e., a tampering sensor), a processor 105, a memory 106, a battery 107, a wireless range check sensor 108, a wireless transceiver 109, light indicators 110, a sound indicator 111, three first detection probes 112a, 112b, 112c, a second detection probe 113 and, optionally, a detected water level sensor 115.

The assembly consisting of the mentioned elements is encapsulated in a leak-tight shell 114, having positive buoyancy in the presence of a water level (on floor 1 of location 2) greater than height "h". This height "h" is defined as the distance existing between the horizontal plane defined by the lower end of the three first detection probes 112a, 112b, 112c and the plane defined by the intermediate horizontal axis of the second detection probe 113. In a preferred embodiment, the distance "h" is comprised between 1 and 2 cm.

The moisture sensor 101 comprises the circuit and the logic or code suitable for measuring the impedance between the three first detection probes 112a, 112b, 112c in order to determine the presence of moisture on the floor 1 of the location 2. It must be noted that the assembly of the flood detector 100 is arranged on the floor 1 supported by the three first detection probes 112a, 112b, 112c. Therefore, in the event that there was a water leakage from a pipe or humidities on the floor or structure of the location 2, the resistance among the three first detection probes 112a, 112b, 112c can drop significantly. Although a particular embodiment describes three probes that are supported by floor 1 in an affixed or retractable manner, the number of probes can vary, never being less than two in number and only limited by the size of the flood detector 100.

The flood detector 100 comprises a gyroscope 102 and/or an accelerometer 103, although the presence of both is indicated in this particular embodiment. The presence of these elements serves a dual purpose: on one hand for detecting the movement of the detector 100 when it is floating, as will be explained below and, on the other hand, for detecting if the flood detector 100 is being inappropriately moved from its location, for example, through manipulation by a child, a pet, etc. In any case, the processor 105 comprises instructions for discerning the type of movement being made. Therefore, if the three first detection probes 112a, 112b, 112c, the second detection probe 113 and the gyroscope 102 or the accelerometer 103 are active, it is evident that of the flood being a large-scale flood. In contrast, if the probes are not active and if the accelerometer 103 and/or the gyroscope 102 is active, it is evident of a change in location 2 of the flood detector 100.

The flood detector 100 additionally has a manipulation sensor 104 or tampering detector comprising the circuits and the logic suitable for detecting when the leak-tight shell 114 is being manipulated or forced open, in which case the detector 100 sends an alarm signal to the user terminal 5 through the management system 3. The manipulation sensor 104 can comprise one or more switches in the leak-tight shell 114 which can be opened or closed when said leak-tight shell 114 opens or closes, respectively. In other words, this manipulation sensor 104 is configured to assure the leak-tightness of the assembly of the detector 100.

Figure 3:
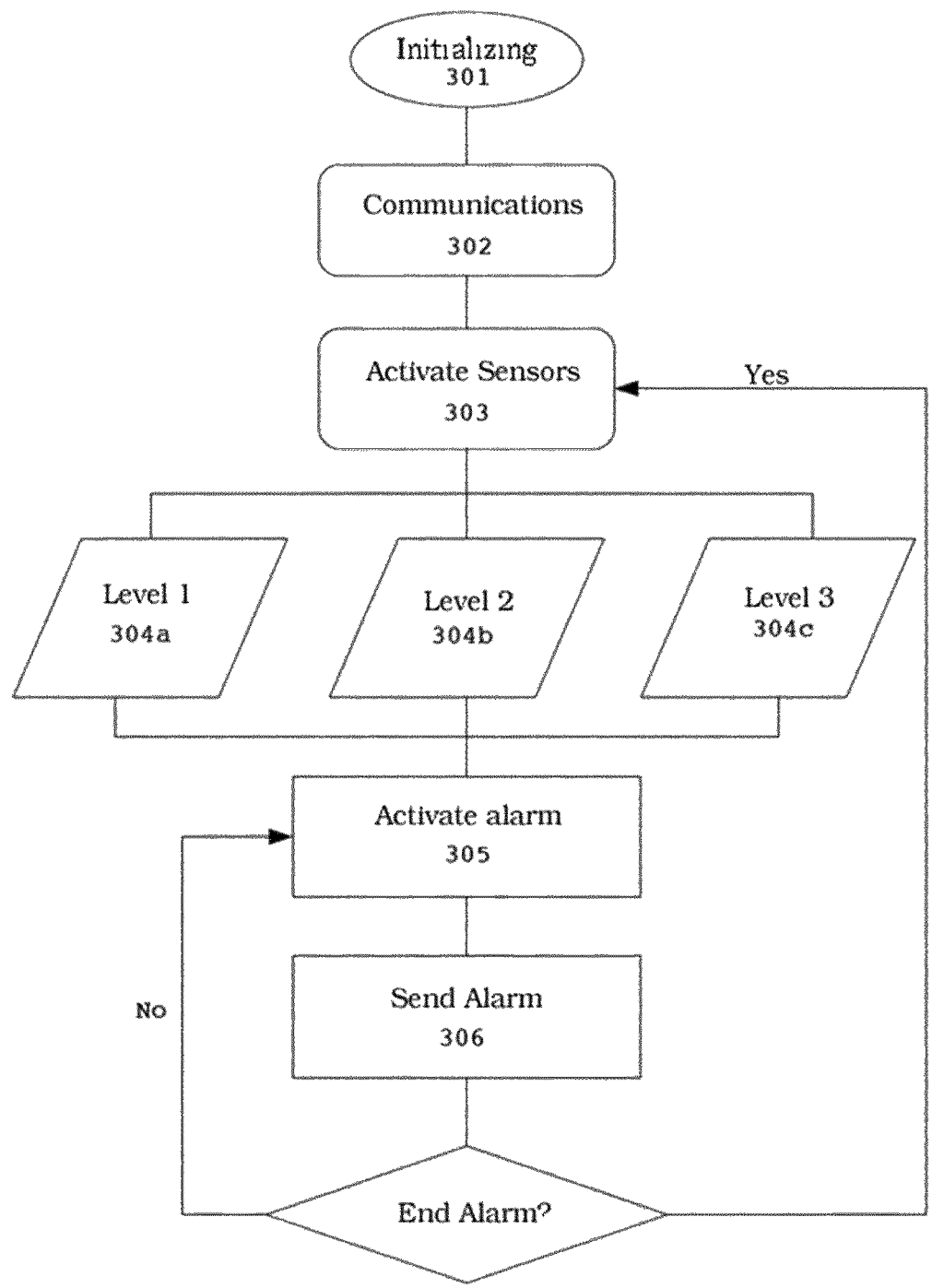
FIG. 3 shows a flow diagram illustrating the steps of operating a flood detector according to a preferred embodiment of the invention.

The detector 100 comprises a program or programs which are stored in the memory 106 and configured for being run by means of the processor or processors 105. The programs comprise instructions for running the method which is described in relation to FIG. 3. The memory 106 can store, for example, configuration data, which can comprise parameters and/or code, comprising software and/or firmware. The memory can comprise different memory technologies, including, for example, read-only memory (ROM), electrically erasable programmable read-only memory (EE-PROM), random-access memory (RAM), low latency non-volatile memory, flash memory, solid state disc (SSD), field-programmable gate array (FPGA), and/or other suitable electronic data storage media capable of storing data, code and/or other information.

The memory 106 can be used for storing the processed data generated by the moisture sensor 101, the gyroscope 102, the accelerometer 103, the manipulation sensor 104, and/or the processor 105. The memory 106 can also be used for storing information, such as configuration information, which can be used for controlling the operation of the flood detector 100. For example, the memory 106 can comprise information required for configuring the wireless transceiver 109 to allow receiving RF signals in the suitable frequency band and a desired communications protocol.

In one embodiment, the detector 100 can be operable for receiving software and/or firmware updates which can be stored in a memory (for example, the memory 106). For example, the detector 100 can receive software and/or firmware updates from a network manager (for example, the management system 3). In one embodiment of the disclosure, the software and/or hardware updates can be received, processed and/or installed automatically and/or manually. For example, the process can be fully automatic (for example, a network administrator can send an update to the detector 100), and/or semi-automatic (for example, an update can be initiated by a user through, for example, the user terminal 5).

The battery 107 can comprise a replaceable battery within the flood detector 100 for providing energy or for backup power supply when a CC input voltage is used. The flood detector 100 can take measurements of the sensors and/or communicate with other devices less frequently when it is powered with the battery 107 and it can only perform continuous detection/communication when an external CC power supply source is used, energy savings is therefore achieved.

The wireless range sensor 108 can comprise the logic or circuits suitable for, for example, determining if the detector 100 is within a range of a management system 3. In this sense, the wireless range sensor 108 can be operable to generate a condition of alarm when the flood detector 100 is not within the range of the management system 3. In one embodiment, if the detector 100 is out of range, a light signal can be generated in the light indicators 110 or a sound signal in the sound indicator 111.

The detector 100 comprises a wireless transceiver 109, which can comprise the circuits and logic suitable for communication through one or more wireless communications protocols, such as Z-Wave, IEEE 802.11x, Bluetooth and ZigBee. The wireless transceiver 109 can therefore comprise RF transmission means, amplification means, demodulation/modulation means and other circuits for signal transmission and reception. Furthermore, the wireless transceiver 109 can be used for providing software/firmware updates to the flood detector 100.

As indicated above, the flood detector 100 comprises a program or programs which are stored in the memory 106 and configured for being run by means of the processor or processors 105. The programs comprise instructions for running the method which is described in relation to FIG. 3. More specifically, the method begins with initializing 301 the detector 100, establishing 302 communications and activating 303 the flood detector 100 once it is located on the floor 1 of a location 2.

Once initialized, the detector 100 is on standby for the activation of one of the three alarm levels 304a, 304b, 304c. Specifically, the first alarm level 304a corresponds with the detection of a low degree of moisture. The detection occurs when the moisture sensor 101 is active. This occurs when the three first detection probes 112a, 112b, 112c detect a change in resistivity (conductivity) between at least two of the three first detection probes 112a, 112b, 112c. In fact, if there is a change in conductivity in at least two detection probes 112a, 112b, 112c, it is indicative that there is moisture on the floor 1 of the location 2 where the flood detector 100 is located.

The second alarm level 304b is activated when the second detection probe 113 is active. It must be noted that for there to be an alarm, both the first probes 112a, 112b, 112c and the second probe 113 must detect moisture, i.e., the conductivity among them must have been changed. The second detection probe 113 is located at a height "h" with respect to the horizontal defined by the lower ends of the first probes 112a, 112b, 112c. In this sense, the second probe 113 will only become active if the water present on the floor 1 of the location 2 reaches height level "h". This indicator will mean that there is a pool or a predetermined water level. In a preferred embodiment, the height "h" will be comprised between 1 cm and cm with respect to the indicated horizontal which furthermore coincides with the horizontal of the floor 1 in the location 2.

Finally, the third alarm level 304c is defined by the activation of the detection probes 112a, 112b, 112c, 113 and the gyroscope 102 and/or accelerometer 103. This activation simply means that the detector 100 is floating on water and that the flood is therefore maximum, exceeding the height level "h" defined by the second probe 113, as the leak-tight shell 114 reaches it positive buoyancy from said threshold.

Finally, in any of these cases, the alarm 305 is activated and is sent 306 to the user terminal 5 through the management system 3, the situation of alarm 305 being maintained until the condition 304a, 304b, 304c of alarm ceases either because there was no longer moisture or because the detector 100 has been remotely reset.

In summary, one of the objects of the invention is the efficient detection of the different situations of alarm which can be caused by the different situations of moisture. In the sensors known in the prior art (such as in patent document US2015/091723, for example) there is only one detection and alarm level, not knowing with certainty which is the flood level present in the location 2. However, up to eight situations of alarm related to the moisture present in the location 2 can be distinguished with the present invention, as shown in the following Table 1.

TABLE 1

| Case | First Probe | Second probe | Acceler/ Gyrosc |
| --- | --- | --- | --- |
| 1 | 0 | 0 | 0 |
| 2 | 0 | 0 | 1 |

TABLE 1-continued

| Case | First Probe | Second probe | Acceler/ Gyrosc |
|---|---|---|---|
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |

In the preceding table, "1" means being in an active state (detection) and "0" means being in an inactive state (no detection). The cases have the meaning shown in Table 2.

TABLE 2

Case 1: Everything is correct. Alarm is not generated.
Case 2: The detector 100 moves but there is no moisture. Alarm signal warning of the movement is sent
Case 3: The second probe 113 is active but there is neither movement nor moisture on the floor. An alarm is generated because there is moisture which is possibly caused intentionally in the probe at a height, but there is no flood.
Case 4: Error alarm is generated because the detector 100 is in motion and there is moisture only in the second probe 113
Case 5: The first probe 112 is active. There is moisture on the floor 1 of the location 2. Alarm notification is sent.
Case 6: Warning of error is sent because the detector 100 is moving and there is moisture. It can be indicative of the manipulation of the detector 100.
Case 7: The first probe 112 and the second probe 113 are active. There is a pool on the floor 1 of the location 2 with a height equal to "h".
Case 8: Probes 112, 113 are active and the detector 100 moves. Warning of the detector 100 floating on the water is sent.

Where appropriate, several embodiments provided in this disclosure can be implemented using hardware, software, or combinations of hardware and software. Also where appropriate, the various hardware components and/or software components established in this document can be combined in composite components comprising software, hardware, and/or both, without departing from the object of the present invention defined in the claims. Where appropriate, the various hardware components and/or software components established herein can be separated into sub-components comprising software, hardware, or both, without departing from the object of the present invention defined in the claims. Furthermore, where appropriate, it is contemplated that the software components can be implemented as hardware components, and vice versa.

The software according to the present description, such as non-transitory instructions, data and/or program code, can be stored in one or more non-transitory machine-readable media. It is also contemplated that the software identified herein can be implemented using one or more general-purpose or specific-purpose networking computers and/or computing systems, and/or of another type. Where appropriate, the order of the various steps described herein can be changed and/or split into sub-steps to provide the features described herein.

The embodiments described above illustrate but do not limit the invention. It must also be understood that a number of modifications and variations are possible according to the object of the present invention. Accordingly, the scope of the invention is defined only by the following claims.

The invention claimed is:

1. A flood detection method, implemented in a flood detector (100) comprising the steps of:
   a) initializing (301) the flood detector (100);
   b) establishing a wireless communication (302) with a remote unit (3,5);
   c) activating (303) the flood detector (100) once it is located on the floor (1) of a location (2);
   d) detecting a plurality of conditions (304a, 304b, 304c) of alarm (305); and
   e) sending (306) said alarm (305) to a user terminal (5) through a management system (3), a situation of the alarm (305) being maintained until said conditions (304a, 304b, 304c) of the alarm ceases;
   wherein the method is characterized in that the conditions (304a, 304b, 304c) of the alarm are defined as:
   e.1) a first moisture level (304a) by means of the activation of a moisture sensor (101) of the flood detector (100), wherein said moisture sensor (101) comprises detecting the change in conductivity in first moisture detection probes (112a, 112b, 112c) of the flood detector (100) which are in direct contact with the floor (1) of the location (2);
   e.2) a second moisture level (304b) when the first moisture level (304a) is active and at least a second detection probe (113) is active; wherein said second detection probe (113) is located at a height "h" with respect to the floor (1) of the location (2); and
   e.3) a third moisture level (304c) when the first moisture level (304a) and the second moisture level (304b) are active and at least one gyroscope (102) or an accelerometer (103) of the flood detector (100) is active.

2. The flood detection method according to claim 1, wherein the flood detector (100) comprising a manipulation sensor (104).

3. The flood detection method according to claim 1, wherein the flood detector (100) comprising a plurality of light indicators (110) and/or sound indicators (111).

4. The flood detection method according to claim 1, wherein the flood detector (100) comprising a water level sensor (115).

5. The flood detection method according to claim 2, wherein the flood detector (100) comprising a wireless range check sensor (108).

6. The flood detection method according to claim 2, wherein the flood detector (100) comprising a plurality of light indicators (110) and/or sound indicators (111).

7. The flood detection method according to claim 5, wherein the flood detector (100) comprising a plurality of light indicators (110) and/or sound indicators (111).

8. The flood detection method according to claim 2, wherein the flood detector (100) comprising a water level sensor (115).

9. The flood detection method according to claim 5, wherein the flood detector (100) comprising a water level sensor (115).

10. The flood detection method according to claim 6, wherein the flood detector (100) comprising a water level sensor (115).

11. The flood detection method according to claim 7, wherein the flood detector (100) comprising a water level sensor (115).

12. A flood detector (100) comprising a leak-tight shell (114) housing:
    a) a moisture detector (101) comprising:
       a.1) first moisture detection probes (112a, 112b, 112c) in direct contact with a floor (1) of a location (2);

b) a gyroscope (102) and/or an accelerometer (103);
c) a wireless transceiver (109)
c) a processor (105);
d) a memory (106);
e) a second detection probe (113) located at a height "h" with respect to the floor (1) of the location (2);
wherein said detector (100) is characterized in that:
the leak-tight shell (114) has positive buoyancy in the presence of a water level equal to or greater than the height "h";
and where the flood detector (100) comprises a program or programs which are stored in the memory (106) and configured for being run by means of the processor (105);
and where the programs comprise instructions for detecting:
a first moisture level (304a) by means of the activation of the moisture sensor (101) wherein said moisture sensor (101) comprises detecting the change in conductivity in the first moisture detection probes (112a, 112b, 112c);
a second moisture level (304b) when the first moisture level (304a) is active and the second detection probe (113) is active;
a third moisture level (304c) when the first moisture level (304a) and the second moisture level (304b) are active and at least the gyroscope (102) and/or the accelerometer (103) is active; and
sending the moisture levels (304a, 304b, 304c) to an external device (3,5) by means of the wireless transceiver (109).

13. The flood detector (100) according to claim 12, comprising a wireless range check sensor (108).

14. The flood detector (100) according to claim 12, comprising a plurality of light indicators (110) and/or sound indicators (111).

15. The flood detector (100) according to claim 13, comprising a plurality of light indicators (110) and/or sound indicators (111).

16. The flood detector (100) according to claim 12, comprising a water level sensor (115).

17. The flood detector (100) according to claim 13, comprising a water level sensor (115).

18. The flood detector (100) according to claim 14, comprising a water level sensor (115).

19. The flood detector (100) according to claim 15, comprising a water level sensor (115).

* * * * *